INVENTOR
A. E. JOEL, JR.
BY Howard R Popper
ATTORNEY

INVENTOR
A. E. JOEL, JR.
BY Howard R. Popper
ATTORNEY 3,143,601

AUTOMATIC NUMBER INTERCEPT IDENTIFICATION SYSTEM

Amos E. Joel, Jr., South Orange, N.J., assignor to Bell Telephone Laboratories, Incorporated, New York, N.Y., a corporation of New York Filed Sept. 20, 1962, Ser. No. 224,984
13 Claims. (Cl. 179—27)

Figure 1:
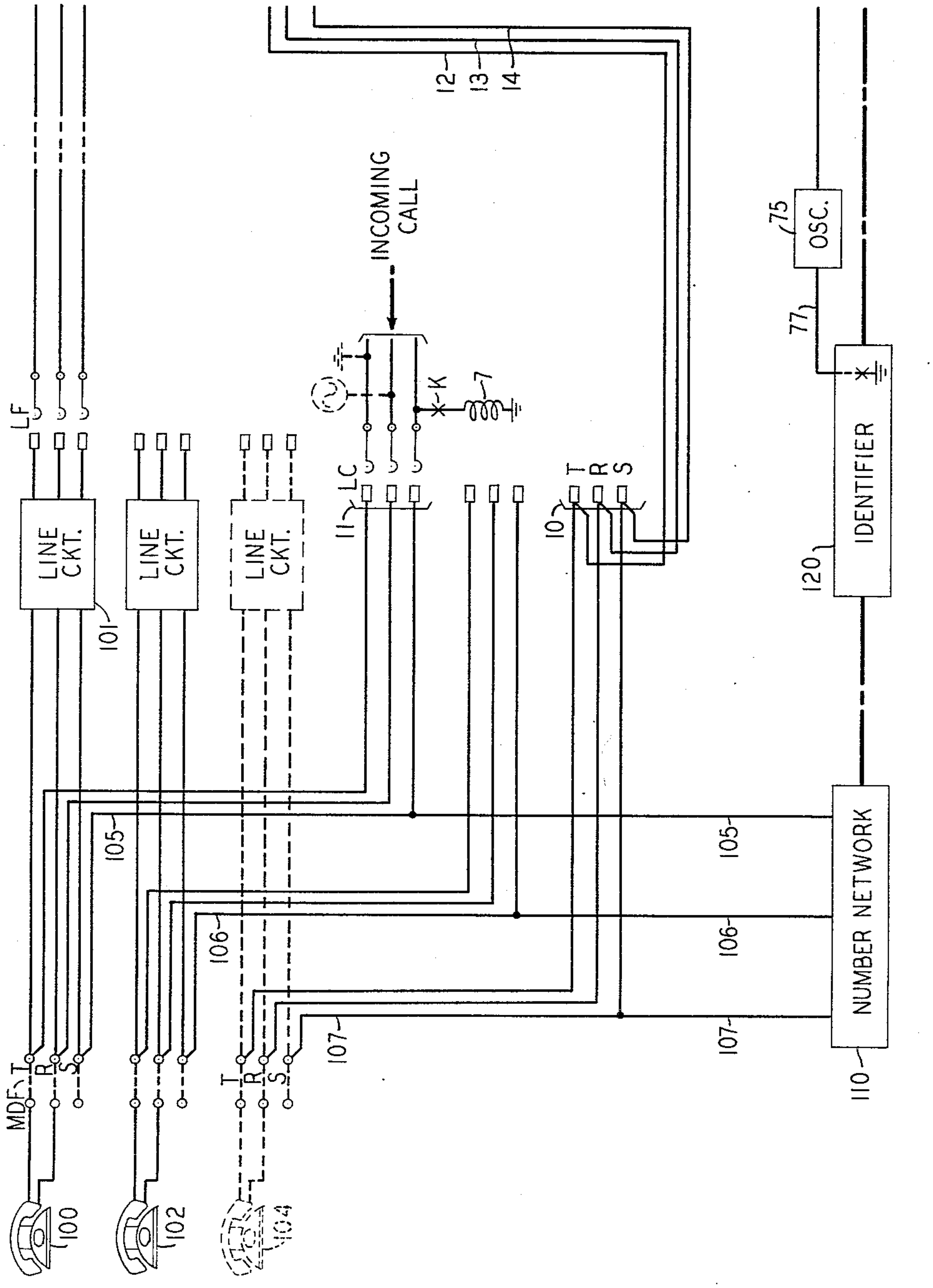

This invention relates to automatic telephone switching systems and more particularly to arrangements for improving call intercept service in such systems.

In automatic telephone switching systems it is desirable to minimize both the necessity and the time required for operator assistance in the handling of calls. Occasionally, a call cannot be completed to the number dialed by the calling party because that number has been discontinued or changed, or is otherwise unavailable for completion of the call in the normal manner. Where the number dialed by the calling party does not exist or has been discontinued, arrangements are known for intercepting and extending the call to a recorded announcement machine which provides suitable instructions to the calling party. Some call situations, however, do not lend themselves to a uniform recorded announcement, but rather require individual service. An example of such a situation is where the called party has recently changed to a new directory number and the old directory number has not been reassigned. Existing telephone practice provides for the interception and routing of such calls to manual intercept operators who must request the number dialed by the calling party, refer to a changed number directory to determine the new number, and inform the calling party thereof.

The practice of requiring the operator to request the number dialed by the calling party has several inherent disadvantages, one of which is the calling party confusion which can result from the appearance of the intercept operator on the line requesting the number dialed. This often leads to the calling party initially relating his own directory number to the operator rather than that of the called party and, accordingly, requires additional operator assistance time in the handling of the call. Further misunderstanding develops where dialing or switching equipment irregularity results in reaching an intercepted number in error. Under present telephone practices, the intercept operator has no way of knowing whether the intercepted number reached by the calling party corresponds to the number which the calling party attempted to reach. Therefore, it is desirable to provide circuitry at the local office responsive to calls to intercepted numbers to identify and forward the numbers automatically to the intercept operator.

Automatic identification of intercepted numbers minimizes the time required for operator assistance, not only in that it precludes the necessity for the operator requesting the number dialed, but further in that the opportunity for calling party confusion is eliminated. Moreover, the identity of the intercepted number may be included advantageously in the information related by the intercept operator to the calling party to eliminate any misunderstanding due to dialing or equipment irregularities, thus improving the service to the customer.

An additional advantage accruing from the automatic identification of intercepted numbers is that it provides a convenient method for maintaining a count of the calls to these numbers. This allows an efficient determination to be made when the volume of calls to an intercepted number has reduced to a level sufficient to permit reassignment of the number. Heretofore, reassignments have been made on the basis of general operating experience without reference to the number of calls made to the individual number.

Accordingly, it is a general object of this invention to improve telephone intercept service and to reduce the amount of operator assistance required in handling intercepted calls.

More particularly, it is an object of this invention to provide a simple, compact and economical intercept circuit arrangement for automatically identifying the directory number of an intercepted call and for transmitting the number to a central intercept office or operator's position.

In certain automatic telephone switching systems in present use, such as those of the crossbar type, the number dialed by the calling party is registered in the terminating equipment at the called party local office. The called number information remains registered in the terminating equipment until the calling party connection is extended to the line terminals corresponding to the number dialed. If the called number is arranged for intercept, therefore, the identity of the number may be obtained directly from the terminating equipment number registers and forwarded to an intercept operator. A suitable intercept circuit arrangement for use in such switching systems is described in O. Myers Patent 2,968,700, granted January 17, 1961.

However, in other telephone switching systems, such as those of the step-by-step and panel type, the dialed number information is not registered in the terminating office equipment, but rather is used and discarded in establishing the connection to the called party line terminals corresponding to the dialed number. If the number is arranged for intercept, the connection is extended through the line terminals to an announcement machine or to a manual intercept operator. Inasmuch as the number dialed is not registered in the terminating office equipment, it cannot be forwarded therefrom to the intercept operator in the manner taught by the above-identified Myers patent. Of course, translation circuitry could be provided at each local office to translate the location of intercepted line terminals into the corresponding directory numbers and circuitry could be provided for registering and forwarding these numbers to the intercept operator, but this would clearly be uneconomical in view of the small percentage of line terminals within a local office which are arranged for intercept at any one time.

It is, therefore, another object of the present invention to make maximum use of the existing circuitry at the local office to provide for the identification and transmission of intercepted called directory numbers without requiring separate and additional translation and registration circuitry therefor.

The above and other objects are attained in an illustrative embodiment of the present invention wherein improved intercept service is provided through the advantageous utilization of a portion of the identification equipment provided at the local office for billing purposes. This identification equipment normally functions only on an outgoing billed call to identify the calling party's directory number and to outpulse the number to a message accounting office. Heretofore, this equipment has served no function with regard to calls incoming to parties at the local office. However, in accordance with the principles of the present invention, the identification equipment is arranged in conjunction with intercept circuitry to function both to identify calling party directory numbers on outgoing billed calls and, also, to identify called party directory numbers on intercepted incoming calls.

The dialed directory number of the called party is employed in the normal manner by the local office switching equipment to establish the calling party connection to the appropriate line terminals corresponding to the called number. If the number is arranged for intercept service, the call is detected by intercept circuitry which seizes the identification equipment at the local office and initiates a connection through to the intercept office. The called number sleeve terminal is marked by a signal which is directed through the identification equipment to identify and register the digits of the called number. When the complete called number has been registered, it is transmitted to the intercept office. The identification equipment is then released, ringing is tripped in a manner so as to prevent charging the calling party for the call, and the calling party connection is extended from the called number line terminals to the intercept office. This connection remains under control of the calling party until he has received suitable instructions from the intercept office as to the current status of the called number. The intercepted number may be included advantageously in the message to the calling party.

Accordingly, a feature of my invention relates to automatic equipment for intercepting calls to changed and discontinued directory numbers, particularly in step-by-step and panel type switching system, for identifying the directory number of the intercepted call, and for forwarding the directory number to a central intercept office.

Another feature of my invention relates to intercept circuitry operative in conjunction with message accounting number identification equipment located at the tele phone local office to provide the directory number of an intercepted call to an intercept operator position.

A further feature of my invention relates to circuitry for employing local office number identification equipment both to identify calling line numbers for billing purposes an dto identify called line numbers for intercept purposes. According to one aspect of the foregoing feature means are provided for seizing the local office calling line identification equipment incident to the completion of an intercept call connection to identify the directory number of the called line.

Figure 2:
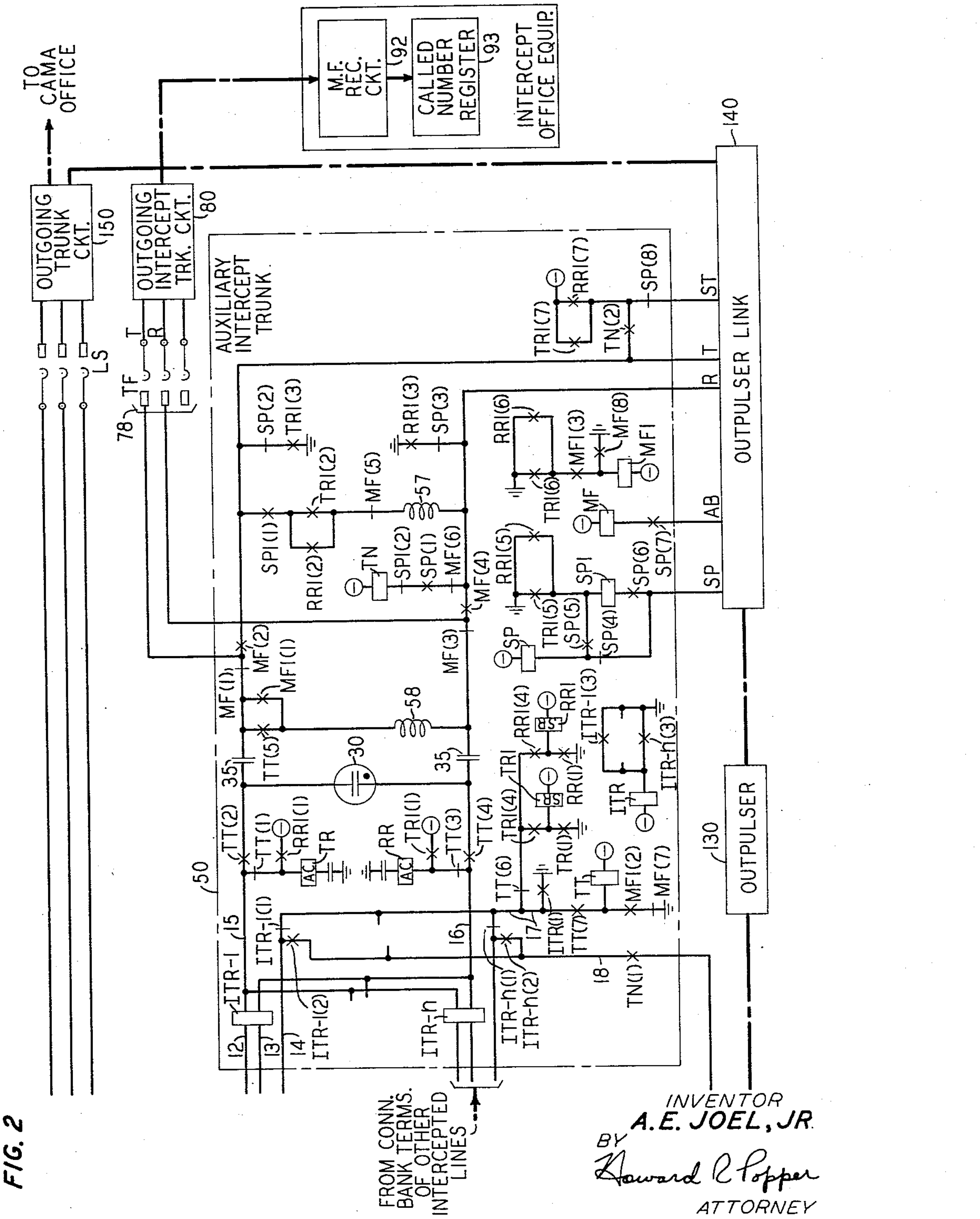

These and other objects and features of the present invention may be better understood upon consideration of the following detailed description and the accompanying drawing which, when FIG. 1 is arranged to the left of FIG. 2, shows an illustrative embodiment of an automatic number intercept identification system in accordance with the principles of the present invention.

The illustrative embodiment of the present invention is depicted in a telephone system of the step-by-step type represented schematically in the drawing. The subscriber stations 100, 102, and 104 and line circuits 101 are of the usual type employed in such telephone systems; and line finder switch LF, selector switch LS and connector switch LC are of the well-known two-motion step-by-step type. These switches are each represented in the drawing by a set of brushes and one or more sets of terminals, all other switch elements and associated apparatus and connections thereto being omitted. A clear and complete description of the structure and operation of such switches is found in "Automatic Telephony" by Smith and Campbell, 2nd edition, pages 53 through 67. Reference may also be had to Patent 2,210,068, granted to T. L. Dimond, August 6, 1940, for a description of a line finder switch of the step-by-step type. The invention is not, however, limited in its application to the particular system shown but is generally applicable to all automatic telephone systems having calling line directory number identification apparatus.

The number identification apparatus employed in the illustrative embodiment comprises number network 110, identifier 120, outpulser 130, outpulser link 140, and outgoing trunk 150, all of which are depicted in block diagram form inasmuch as their details and interconnection may be found in the copending application of H. D. Cahill and C. H. Dagnall, Jr., Serial No. 658,384, filed May 10, 1957, now Patent No. 3,071,650, issued January 1, 1963. The sleeve leads associated with subscriber stations 100, 102 and 104 are connected by individual conductors 105, 106 and 107, respectively, to corresponding coordinate points in the resistive grid arrangement (not shown) in number network 110. The directory number significance of each sleeve lead is identified in terms of vertical and horizontal busses attached to the coordinate point in number network 110 to which the sleeve lead is connected. Connected to number network 110 is identifier 120 which includes detector circuits that scan the horizontal and vertical busses in number network 110 to find the ones thereof that are connected to the sleeve lead of the calling line to be identified. Outpulser 130, which is connected to identifier 120, comprises circuitry for registering and checking the directory number digits representing the calling line and circuitry for outpulsing the number digits, along with an information digit, on a multifrequency basis. Outpulser link 140 provides the interconnection facilities between outgoing trunk 150 and outpulser 130.

Briefly, the operation of the identification apparatus in identifying the directory number of a calling line and forwarding the number to an accounting center for billing purposes is as follows: when a calling party, e.g., subscriber station 100, initiates a call for which the station is to be billed by centralized automatic message accounting (CAMA) equipment, the automatic switching apparatus operates as usual under control of the calling station's dial to extend the tip, ring and sleeve leads of the calling station through line finder switch LF and through one or more selector switches LS to an outgoing trunk 150. At the same time party information is passed to trunk 150. The call proceeds in the normal fashion until the dialed number has been transmitted through outgoing trunk 150 to a sender (not shown) at the CAMA office. At that point a request from the CAMA office for identification of the calling line directory number brings the identification apparatus into operation. Outgoing trunk 150 recognizes the identification request from the CAMA office and establishes connections through preferencing circuitry in outpulser link 140 to an idle outpulser 130. Trunk 150 passes the party information to outpulser 130. By means of connecting facilities within itself, outpulser 130 seizes an identifier 120 and passes the party information thereto. Identifier 120 registers the party information and connects the number network 110.

Thereupon, outgoing trunk 150 marks the calling line sleeve lead by superimposing an alternating-current identification signal on the sleeve lead holding ground toward line circuit 101. The identification signal finds its way back through the switching train over the sleeve lead of the calling line and along conductor 105 to number network 110. The signal thus appears on the horizontal and vertical busses uniquely corresponding to the directory number of the calling line, where it is detected by identifier 120 and transferred to digit registers in outpulser 130 in two-out-of-five coded form. A single information digit is also registered in outpulser 130 to indicate certain conditions, e.g., whether identification was successful or whether the assistance of a CAMA operator is required. Assuming identification to be successful, identifier 120 is released and outpulser 130 proceeds to oupulse the information digit followed by the calling line directory number digits to the CAMA office on a multifrequency pulsing basis. Outpulsing is preceded, as is customary, by a key pulse signal which prepares the multifrequency receiving equipment in the CAMA office for receiving the multifrequency pulses. Outpulser 130 is then released and outgoing trunk 150 completes the transmission path with talking battery and supervision toward the calling party and with trunk supervision toward the CAMA office. If identification of the calling line directory number is unsuccessful, only the corresponding information digit is outpulsed and outpulser 130 releases itself.

The present invention contemplates the advantageous utilization of such directory number identification apparatus, in conjunction with intercept circuitry, to function both to identify the calling line directory number on outgoing CAMA-billed calls and to identify the directory number of called lines on intercepted calls. The operation of the identification apparatus in identifying calling line directory numbers for billing purposes is unchanged from that described briefly above and in greater detail in the above-mentioned Cahill-Dagnall patent. The manner of gaining access to the identification apparatus and the operation thereof in identifying and forwarding to a central intercept office the directory number of an intercepted call is described in detail below. However, initially it may be noted that the identification apparatus operates on a one-at-a-time basis, and thus access to the identification apparatus for intercept identification purposes and access thereto for calling line identification purposes must be in a mutual lockout relationship.

In the illustrative embodiment described below, this is handled with a minimum of additional circuitry by having both identification situations appear the same to the identification apparatus, any use of the identification apparatus therefore busying the equipment to all other requests during the use thereof, whether for intercept or for billing purposes. More particularly, as described in the above-identified Cahill-Dagnall patent, outpulser link 140 comprises a plurality of trunk preference relays (not shown) connected in a preference chain arrangement. Each outgoing trunk circuit 150 is connected to an individual one of the trunk preference relays. In a similar manner, in the illustrative embodiment of the present invention, individual trunk preference relays are provided in the preference chain arrangement in outpulser link 140 for each auxiliary intercept trunk 50. Thus, both outgoing trunk circuits 150 and auxiliary intercept trunk circuits 50 appear the same to the identification equipment, and no more than one trunk circuit at a time can gain access thereto.

Before proceeding with a description of the intercept circuitry and the operation thereof in conjunction with the above-described identification equipment to identify called line numbers on intercepted calls, it might be well to briefly consider the operation of the illustrative telephone system on an incoming call. Each subscriber station is connected through terminals of a main distributing frame MDF to an individual set of terminals, such as terminals 11, in connector switch LC. The individual sets of terminals of connector switch LC each have permanent directory number significance, and a particular directory number is thus assigned to a subscriber station via cross connections at main distributing frame MDF. On a call to subscriber station 100, for example, the automatic telephone switching equipment responds to the dialed directory number corresponding thereto to connect the calling line to the connector switch LC having access to set of terminals 11. Connector switch LC makes a busy test of the called line and, if the line is idle, the calling line connection is extended through set of terminals 11 and the cross connections at frame MDF to subscriber station 100. A ringing circuit is connected to the tip and ring leads of the called line and a contact K of the line connector LC is closed to ground the sleeve lead of the called line as an indication to subsequent calls that the line is busy. (Conventionally, ground is directly applied by contact K, however, as will hereinafter be pointed out in relation to the invention, it is desirable that this ground be provided to contact K over an inductor 7.) When the called subscriber station 100 answers, ringing is tripped and the conversation path completed; however, the sleeve lead ground remains for the duration of the call until the calling party disconnects.

Subscriber station 104 is similarly assigned a particular directory number via cross connections at frame MDF to terminals 10 in connector switch LC.

Now assume, for purposes of describing the present invention, that subscriber station 104 has recently changed to a new directory number. Thus the cross connections at frame MDF between subscriber station 104 and set of terminals 10 are disconnected, and subscriber station 104 is connected to a different set of terminals which correspond to the new directory number. Set of terminals 10 in connector switch LC no longer corresponds to the directory number of subscriber station 104, but retains its identity with the old directory number of station 104. For some indeterminate period of time after the directory number change, persons uninformed of the change will continue to attempt to reach subscriber station 104 by dialing the old directory number. During at least a part of this period of time the old directory number, and thus set of terminals 10, will not be reassigned to a different subscriber station. It is therefore necessary, as discussed above, to intercept calls to the old directory number corresponding to terminals 10 and to inform the calling party of the new directory number of subscriber station 104.

For this purpose, auxiliary intercept trunk 50 is provided to intercept calls to predetermined directory numbers and to extend the connection from the calling line through to a central intercept office or intercept operator's position. Auxiliary intercept trunk 50 further functions advantageously in conjunction with the number identification apparatus provided at the local office for billing purposes to identify and to forward the identity of the called directory number to the intercept office or operator's position. As illustrated in the drawing, intercept trunk 50 may serve a plurality of directory numbers for which it is desired to intercept calls directed thereto. Each such directory number is arranged for intercept by disconnecting any subscriber station equipment from the connector switch terminals corresponding to the directory number. The connector switch terminals are then connected to individual intercept relays, such as relays ITR–1 and ITR–*n*, in auxiliary intercept trunk 50. Connector switch terminals 10 are arranged for intercept, for example, by connecting the tip and ring lead connections thereof via conductors 12 and 13 through individual windings of intercept relay ITR–1 to tip bus 15 and ring bus 16, respectively, in intercept trunk circuit 50. When relay ITR–1 is normal, the sleeve lead connection of terminals 10 is connected via conductor 14 through a back contact ITR–1(1) to busy conductor 17. When relay ITR–1 is operated, conductor 14 is connected through front contact ITR–1(2) to sleeve bus 18.

A plurality of intercept trunks such as trunk 50 are individually connected via their respective tip and ring busses to sets of terminals in banks of trunk finder switch TF. Trunk finder switch TF may be similar to line finder switch LF, and is represented in the drawing by a set of brushes and a set of terminals, all other switch elements and associated apparatus and connections thereto being omitted. Trunk finder switch TF is provided to concentrate the intercepted traffic over a smaller group of trunks, e.g., outgoing intercept trunk 80, to the central intercept office or operator's position common thereto.

The operation of the present automatic number intercept identification arrangement will be fully understood from consideration of a typical call from a party attempting to reach subscriber station 104 by dialing the old directory number corresponding to terminals 10 in connector switch LC. Under control of the calling party's dial the switching equipment extends the calling party connection to connector switch LC. A busy test is made of terminals 10, and assuming auxiliary intercept trunk 50 connected thereto to be idle, the tip, ring and sleeve leads to the calling party are extended through terminals 10 to trunk 50. Connector switch LC connects a ringing circuit to the tip and ring leads and closes contact K to ground the sleeve lead. Assuming the directory number dialed to correspond to a single-party line or to the ring party of a two-party line, therefore, the ringing source is applied to the ring lead and ringing ground is applied to the tip lead as shown in the drawing. The ringing signal on the ring lead is continued over conductor 13 through the lower winding of intercept relay ITR–1 to ring bus 16 and operates alternating current relay RR, the path therefor being completed from ring bus 16 through a back contact TT(3) and the winding of relay RR to ground. Intercept relay ITR–1 is not operated by the alternating-current ringing signal through its lower winding. The ground applied through contact K (FIG. 1) to the sleeve lead busies terminals 10 for any subsequent calls to the directory number corresponding thereto until the present calling party disconnects.

The operation of relay RR completes an obvious path from ground through a front contact RR(1) and the winding of relay RR1 to battery, thereby operating relay RR1. In operating, relay RR1 locks up to the sleeve lead ground through a circuit including front contact RR1(4), back contact TT(6), conductor 17, back contact ITR–1(1), conductor 14 and the sleeve lead connection of terminals 10. Operation of relay RR1 completes a circuit from battery through front contact RR1(1), back contact TT(1), tip bus 15, the upper winding of relay ITR–1, conductor 12 and the tip lead connection of terminals 10 to the ringing ground. This operates intercept relay ITR–1 which transfers the connection of conductor 14, and thus the sleeve lead of the called number, from busy conductor 17 to sleeve bus 18 through a front contact ITR–1(2).

Operation of intercept relay ITR–1 operates relay ITR which grounds busy conductor 17 through front contact ITR(1). Contact ITR(1) operates to ground busy conductor 17 upon the energization of any of the intercept relays in trunk 50, such as relays ITR–1 and ITR–*n*. Busy conductor 17 is connected through back contacts of the other intercept relays, such as intercept relay ITR–*n*, to the sleeve lead terminals in connector switch LC of other directory numbers arranged for intercept. The ground on conductor 17, therefore, busies intercept trunk 50 to calls directed to these other directory numbers during the use thereof for the call intercepted at terminals 10. Further, operation of intercept relay ITR–1 transfers the locking circuit for relay RR1 from the sleeve lead holding ground to the busy conductor ground through contact ITR(1).

Seizure of the number identification apparatus for identification of the directory number of the intercepted call is initiated by the operation of relay RR1. Battery is applied through front contact RR1(7), back contact SP(8) and start lead ST to outpulser link circuit 140. Lead ST is connected to the winding of a trunk preference relay (not shown) individual to trunk circuit 50 in outpulser link circuit 140. Assuming that no other intercept trunk circuit and that no other outgoing trunk circuit 150 is seeking an outpulser at this time, the trunk preference relay individual to trunk circuit 50 operates to effect the seizure of an idle outpulser 130. Leads SP, R, T and AB are extended from intercept trunk circuit 50 through outpulser link circuit 140 to outpulser 130.

At this time party line identification is passed to outpulser 130. Since it was assumed that the called directory number was a single-party line, or a ring party on a two-party line, relay RR and relay RR1 operated as described above. Operation of relay RR1 connects ground through front contact RR1(3) and back contact SP(3) over lead R to outpulser 130. The ground on lead R operates a relay (not shown) in outpulser 130 to register the party information.

Upon proper registration of the party information, outpulser 130 grounds lead SP to trunk circuit 50 to complete a circuit through back contact SP(_) and the winding of relay SP to battery. Relay SP operates in this circuit and locks through front contact SP(5) thereof and front contact RR1(5) to ground. In operating, relay SP disconnects its winding and battery from lead SP and connects ground thereto through a winding of relay SP1. Operation of relay SP also disconnects ground from lead R to outpulser 130 and battery from lead ST to outpulser link circuit 140. The connection of ground to lead SP is recognized by outpulser 130 that relay SP has operated. Outpulser 130 then alters several internal connections and applies battery to lead SP to complete a circuit through front contact SP(6), the winding of relay SP1, and front contact RR1(5) to ground. Relay SP1 operates in this circuit.

Outpulser 130 then makes a test to insure that the call has not been abandoned before connecting to identifier 120. For this purpose, a circuit is closed from battery in outpulser 130 through lead R, inductor 57, back contact MF(5), front contact RR1(2), front contact SP1(1) and lead T back to ground in outpulser 130. If the call is abandoned by the calling party before this point relay RR1 will be released, opening the circuit just traced. Assuming that the circuit is complete outpulser 130 connects to identifier 120 and, in doing so, removes battery from lead SF, releasing relay SP1. The party line identification is passed by outpulser 130 to identifier 120, which makes the proper connections to number network 110.

The number identification apparatus is now ready to identify the called line directory number on the intercepted call. With relay SP1 released, a circuit is completed from battery through a winding of relay TN, back contact SP1(2), front contact SP(1), back contact MF(6) and lead R to ground in outpulser 130. Relay TN operates in this circuit and closes a circuit from battery through front contact RR1(7), front contact TN(2) and lead T to outpulser 130. Tone oscillator 75 (FIG. 1) is rendered effective by identifier 120 through the connection of ground to lead 77, and the operation of relay TN connects tone supplied by oscillator 75 through front contact TN(1) to sleeve bus 18. The tone on sleeve bus 18 is directed through front contact ITR–1(2) to conductor 14, and thence along lead 105 to number network 110. Inductor 7 in connector switch LC insures that the tone signal on conductor 14 will be directed along lead 105 to number network 110. The tone signal thus appears on the horizontal and vertical busses in number network 110 uniquely corresponding to the directory number associated with set of terminals 10. The tone is detected by identifier 120 to identify the called directory number and to transfer the number to digit registers in outpulser 130.

After checking to see that all of the directory number digits have been identified and registered, outpulser 130 releases identifier 120 and disconnects ground from lead R to intercept trunk circuit 50. Relay TN is thereby released, disconnecting the tone signal from sleeve bus 18 and disconnecting battery from lead T to outpulser 130. Outpulser 130 detects the removal of battery from lead T and prepares itself for transmitting the identified directory number of the intercepted call to the central intercept office. To prepare intercept trunk 50, outpulser 130 grounds lead AB to complete a circuit through front contact SP(7) and the winding of relay MF to battery. Relay MF operates in this circuit to connect leads R and T to the set of terminals 78 of trunk finder switch TF. Operation of relay MF also completes an obvious circuit operating relay MF1, which locks through front contact MF1(3) thereof and front contact RR1(6) to ground.

Outpulser 130 now closes a direct-current path across leads R and T, completing a circuit through front contacts MF(2) and MF(4) to operate trunk finder switch TF in the normal manner. Brushes in trunk finder switch TF connected to a trunk to the intercept office, such as outgoing intercept trunk 80, find the terminals 78 associated with intercept trunk 50 and complete the connection between trunk 50 and outgoing trunk 80. The outpulsing circuit is then complete from outpulser 130 through leads R and T, front contacts MF(2) and MF(4), terminals 78 of trunk finder switch TF and outgoing intercept trunk circuit 80 to a multifrequency receiving circuit 92 at the intercept office equipment. Transmission of the identified directory number of the intercepted call to the intercept office equipment proceeds from outpulser 130 on a multifrequency basis, the directory number identity being registered in register 93.

Should identifier 120 fail for any reason to identify the called directory number, an information digit indicating this is registered in outpulser 130 in the same manner as when identifier 120 fails to identify a calling line directory number. In this instance only the information digit is transmitted to the intercept office to call in an intercept operator who must request the number dialed by the calling party.

Upon completion of the transmission to the intercept office outpulser 130 releases and outpulser link circuit 140 disconnects from intercept trunk 50. Release of outpulser 130 removes the ground from lead AB, thereby releasing relay MF and restoring the connection through front contacts TT(5) between ring and tip busses 15 and 16 and the intercept office through trunk finder switch TF and outgoing intercept trunk circuit 80. The release of relay MF completes a circuit from ground through back contact MF(7) thereof, front contact MF1(2) and the winding of relay TT to battery. Relay TT operates in this circuit and locks through its own front contact TT(7), conductor 17 and contact ITR(1) to ground. The transmission path forward from trunk 50 through trunk finder switch TF is maintained, upon the release of outpulser 130 and relay MF, by a direct-current circuit bridging the tip and ring connections to terminals 78. This circuit may be traced through back contacts MF(1) and MF(3), front contact MF1(1) and inductor 58. When relay TT operates, an alternate maintaining circuit is completed through front contact TT(5) in parallel with the above-mentioned front contact of relay MF1. The circuit through the front contact of relay TT maintains the transmission path forward to the intercept office until the calling party disconnects.

Operation of relay TT disconnects the locking circuits for relays RR1 and ITR–1, thereby releasing the locking circuits for relays SP and MF1. Release of relay ITR–1 opens contact ITR(1) transferring the holding ground for relay TT to the sleeve lead holding ground in connector switch LC. This circuit may be traced from battery through the winding of relay TT, front contact TT(7), conductor 17, back contact ITR–1(1), conductor 14, sleeve lead terminal of terminals 10, contact K, inductor 7 to ground. Relay TT, therefore, remains energized under control of the calling party. When the calling party disconnects, contact K opens to release relay TT. The appearance of the sleeve lead holding ground on busy conductor 17, as above-traced, also maintains intercept trunk 50 in the busy condition for the duration of the call.

When relay TT operates upon the release of the identification apparatus, front contacts TT(2) and TT(4) thereof complete the transmission path from the calling party to the intercept office. This circuit is completed from the ring and tip terminals of connector switch terminals 10, through conductors 12 and 13, windings of relay ITR–1, ring and tip busses 15 and 16, front contacts TT(2) and TT(4), capacitors 35, back contacts MF(1) and MF(3), terminals 78 of trunk finder switch TF, and outgoing intercept trunk circuit 80 to the intercept office. Closure of this set of front contacts of relay TT also connects diode 30 across the ring and tip busses 15 and 16 to trip ringing without providing a direct-current supervisory path. This prevents the calling party from being charged for the call.

For the above description it was assumed that the called directory number corresponded to a single-party line, or to a ring party on a two-party line. It will be evident, however, that the operation of the present circuit is substantially similar to that described above where the intercepted call is to a directory number corresponding to a tip party, except that relays TR and TR1 are operated rather than relays RR and RR1. Thus, a tip party indication is provided to the outpulser over lead T when relay TR1 operates to connect ground to lead T through front contact TR1(3) and back contact SP(3).

What has been described herein, therefore, is a simple and economical intercept circuit arrangement which is operative in conjunction with existing number identification circuitry at the local office to automatically identify the directory number of an intercepted call and to transmit the identified number to a central intercept office. It is to be understood, however, that the particular arrangements described above are merely illustrative of the application of the principles of my invention. Numerous other arrangements may be devised by those skilled in the art without departing from the spirit and scope of the invention.

What is claimed is:

1. A telephone switching system comprising a local office including a calling line and a called line each having distinct directory numbers, identification equipment at said local office operative to identify the directory number of said calling line, switching means responsive to the directory number of said called line for establishing connections to said called line, means for intercepting calls to said called line, and means under control of said intercepting means for operating said identification equipment to identify the directory number of said called line instead of said calling line.

2. A telephone switching system in accordance with claim 1 further comprising an intercept operator trunk and means for transferring said called line directory number to said intercept operator trunk.

3. A telephone system in accordance with claim 2 further comprising switching means under control of said identification equipment and said intercepting means for connecting said called line to said intercept operator trunk.

4. A telephone switching system comprising a local office, a plurality of lines at said local office each having a corresponding directory number, identifying equipment at said local office including translator means and means responsive to a call from a calling one of said lines for connecting said translator means to said calling line to identify the directory number thereof, an intercept office, means for intercepting calls to a called one of said lines at said local office, means coupled to said intercepting means and operative incident to the interception of a call for connecting said identifying equipment to said called line, means for operating said translator means to identify the directory number of said called line instead of the directory number of a calling line, means operated by said translator means for registering identified directory numbers, and means for transmitting said called line directory numbers only to said intercept office.

5. A telephone switching system comprising a plurality of subscriber lines having individual directory number designations, some of said subscriber lines being unavailable for use, means for registering directory number designations, number network and identifier means associated with said subscriber lines and operative to selectively provide said individual directory number designations to said registering means, intercept trunk means including means for detecting a call to one of said unavailable subscriber lines, means responsive to said detecting means for operating said number network and identifier means, the operation thereof providing the individual directory number designation of said one unavailable subscriber line to said registering means, a called line directory number register, and means operative in conjunction with said intercept trunk means for transferring the directory number designation of said one unavailable line from said registering means to said called line directory number register.

6. A telephone switching system including a local office having a plurality of lines assigned distinctive directory numbers, identifying equipment at said local office, first circuit means for connecting said identifying equipment to a calling one of said lines to identify the directory number of said calling lines, and means for intercepting calls to predetermined ones of said lines, said switching system being characterized by second circuit means connecting said intercepting means to said identifying equipment in response to a call to one of said predetermined lines, and means including said identifying equipment operative incident to the connection thereto of said intercepting means for identifying the directory number of said one of said predetermined lines instead of a calling one of said lines.

7. A telephone switching system in accordance with claim 6 being further characterized by an intercept office and means for transmitting the directory number of said one predetermined line to said intercept office.

8. A telephone switching system in accordance with claim 6 being further characterized by said first and second circuit means being in a mutual lockout relationship.

9. In a telephone switching system, the combination comprising a calling line and a called line, said called line being unavailable for receiving calls, line number identification equipment located at the same office as said called line, means under the control of said line number identification equipment for outpulsing identified line numbers, an intercept position including means to record called line numbers, means for intercepting calls to said called line, means operated by said intercepting means for connecting said called line with said line number identification equipment, means for operating said line number identification equipment to identify the number of said called line and to provide said called line number to said outpulsing means, means operated by said intercepting means for connecting said registering means in said intercept office with said outpulsing means, and means operative after the outpulsing of said called line number to said registering means for interconnecting said intercept office and said calling line, said interconnection being maintained under the control of said calling line.

10. A telephone switching system comprising a local office, a plurality of line terminals in said local office each having a corresponding number designation, identifying equipment at said local office including means for registering the digits of a line terminal number designation, an intercept office including means for registering called line number designations, means for intercepting calls to selected ones of said line terminals, means responsive to said intercepting means for connecting said identifying equipment with a called one of said selected line terminals to register the number designation of said called line terminal, means under the control of said intercepting means and said registering means to transmit the digits of said called line terminal number designation to said intercept office, and means operative upon the completed operation of said transmit means for connecting said intercept office with said called line terminal.

11. A telephone switching system according to claim 10 wherein some of said plurality of line terminals are associated with two party lines, each party line having a distinct number designation, said intercepting means comprising means for identifying the called party line on an intercepted call to one of said plurality of line terminals associated with two party lines and means for providing the party line identification to said identifying equipment.

12. In a telephone switching system, a local office, a plurality of lines in said local office each having a corresponding directory number, means for marking a calling one of said lines, means for intercepting and marking a called one of said lines, line identification equipment for detecting a marked one of said lines, means under the control of said detecting means to register the director number corresponding to a marked line, means operative to transmit directory numbers registered in said register means, an intercept office, means responsive to said intercepting and marking means for providing a transmission connection between said intercept office and said transmit means, and means for disconnecting said transmit means from said intercept office and for connecting said intercept office to said calling one of said lines upon the completed operation of said transmit means.

13. In a telephone switching system, a plurality of lines each having a corresponding directory number, means for marking a calling one of said lines, means for intercepting and marking a called one of said lines, line identification equipment including means for detecting a marked one of said lines and means under the control of said detecting means to identify the directory number of a marked one of said lines, a first outgoing trunk circuit, a second outgoing trunk circuit, means under control of a calling line for connecting said line identification equipment to said first outgoing trunk circuit, means under control of said intercepting means for connecting said line identification equipment to said second outgoing trunk circuit, and switching means controlled by said line identification equipment and said intercepting means for connecting said called line to said second outgoing trunk circuit.

No references cited.